April 14, 1959 W. KRUMME 2,881,665
PROCESS AND MACHINE FOR THE PRODUCTION OF BEVEL GEARS
Filed Sept. 10, 1953 6 Sheets-Sheet 6

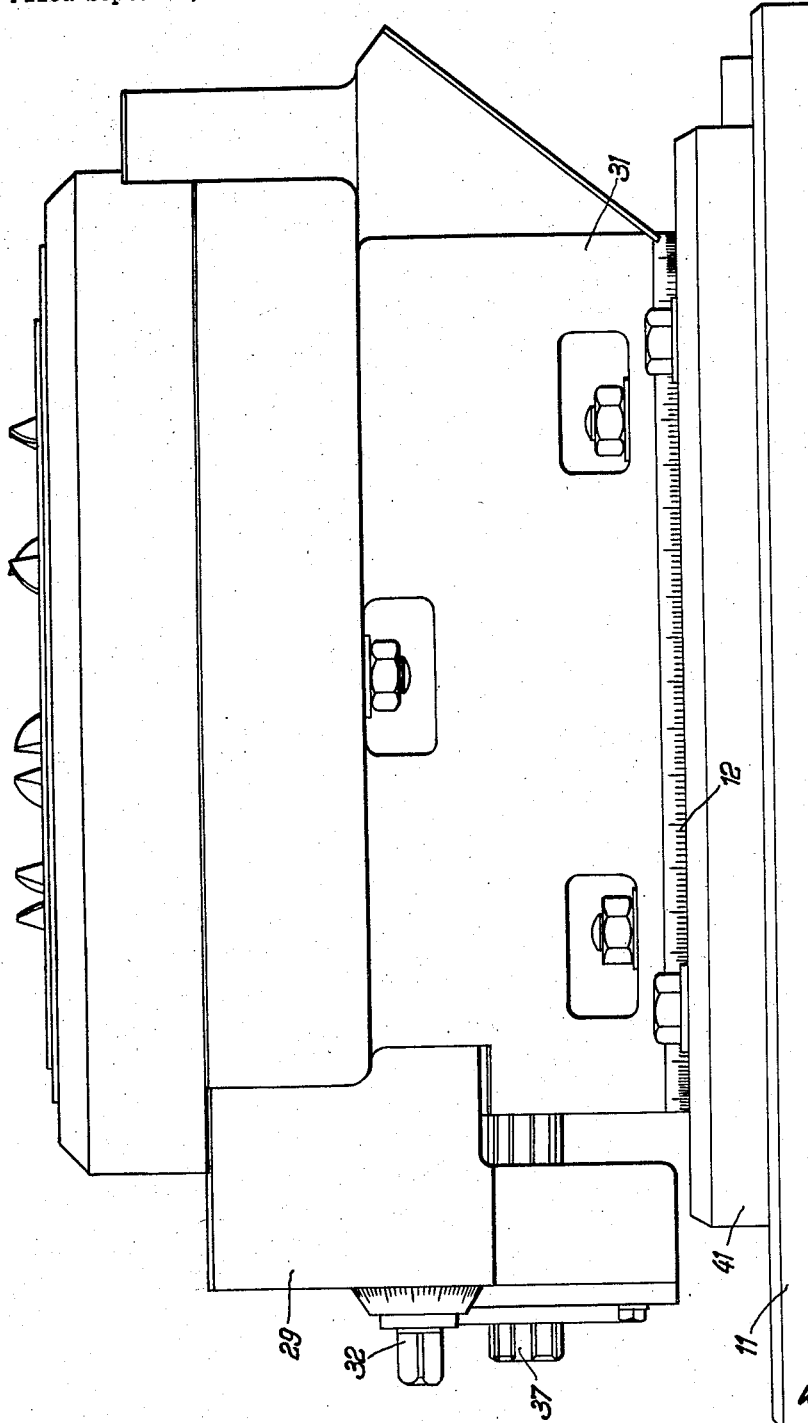

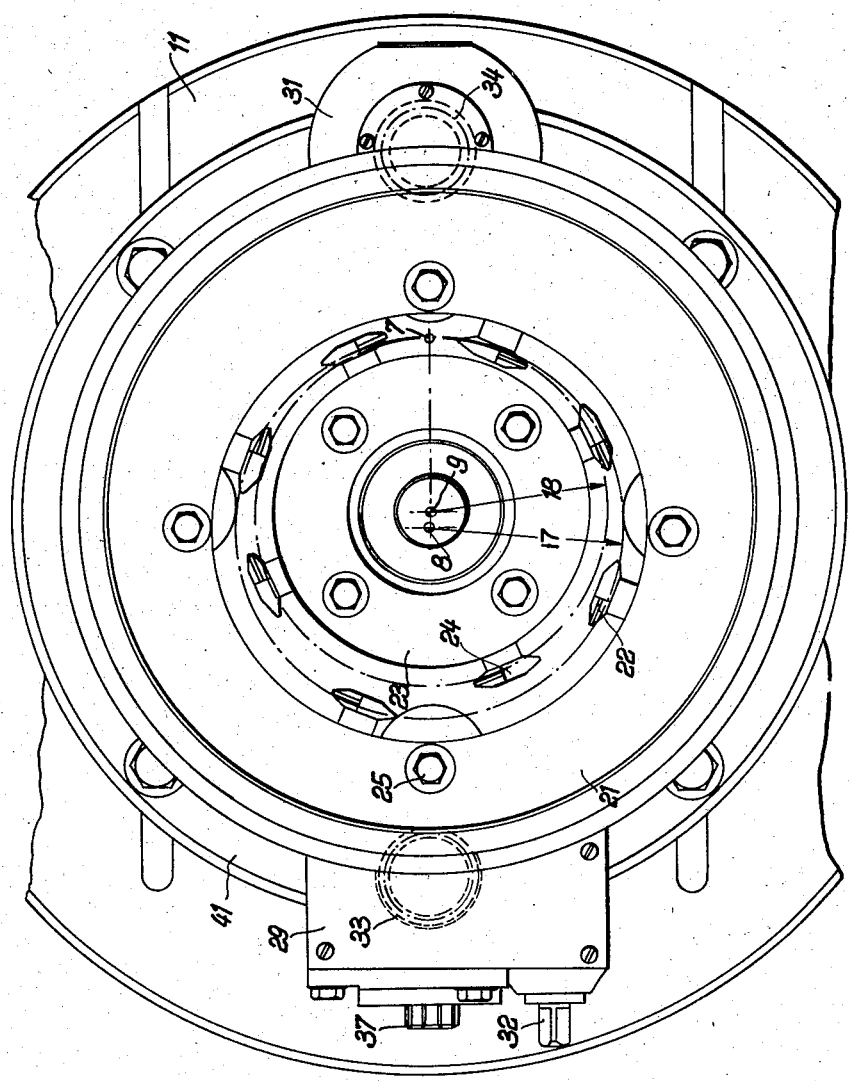

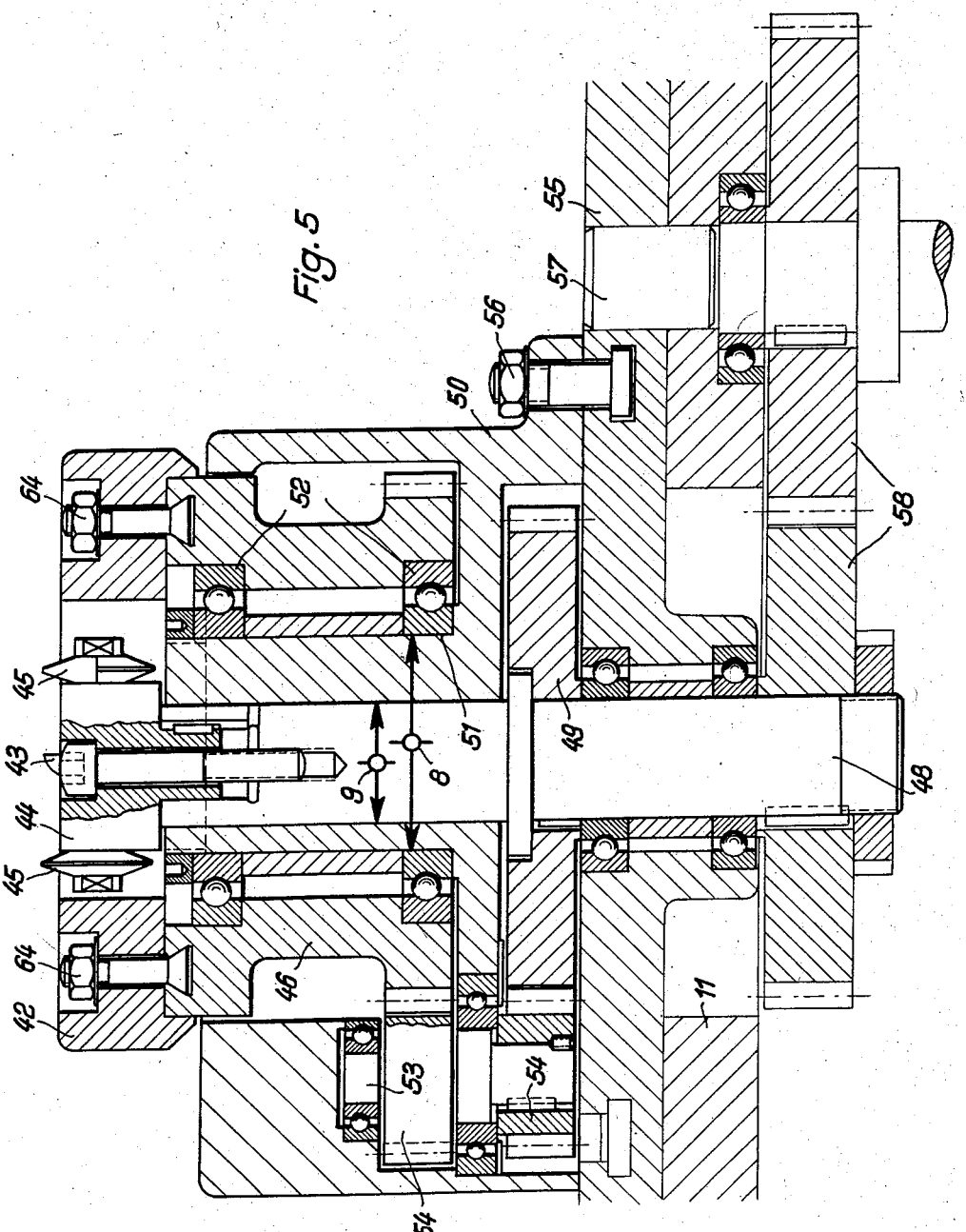

Inventor:
Walter Krumme
BY Jewell, Mead, Browne
& Schuyler
ATTORNEYS.

United States Patent Office 2,881,665
Patented Apr. 14, 1959

2,881,665

PROCESS AND MACHINE FOR THE PRODUCTION OF BEVEL GEARS

Walter Krumme, Wuppertal-Ronsdorf, Germany, assignor to W. Ferd. Klingelnberg Sohne, Remscheid-Berghausen, Germany, a corporation of Germany Application September 10, 1953, Serial No. 379,378

11 Claims. (Cl. 90—5)

This invention relates to a process and machine for the production of bevel gears, and more particularly to a process and machine for the production of bevel gears having teeth cycloidally curved in the longitudinal direction.

Bevel gears with teeth cycloidally curved in the longitudinal direction are produced by a continuous generating process using a cutter block with inserted blades. The cutter block rotates about its own axis and at the same time performs a planetary movement about the axis of the imaginary crown wheel represented by the paths of its cutter blades.

Cutting takes place over only a fraction of the blade path; namely, that portion which corresponds with the tooth length of the crown wheel, and the principle is such that the right-hand spiral is used for generating one of the gears while the mating gear is generated with a left-hand spiral. The blades must not carry out any cutting action while passing through the opposing flanks. Since the process itself is well-known, there is no need to enlarge on this introductory statement of the basic principle.

It is an object of this invention to provide a method and apparatus which permits the production of bevel gears having teeth cycloidally curved in the longitudinal direction and exhibiting localized tooth contact over a curved surface.

It is another object of this invention to provide a method and apparatus which simplifies the design of bevel gears having teeth cycloidally curved in the longitudinal direction, so that the designer is no longer restricted to certain specific spiral angles, types of cutter block, numbers of teeth in the gears to be cut, and the like, which have to be taken into account when designing for conventional gear-cutting systems.

It is still another object of this invention to provide a machine for cutting bevel gears having teeth cycloidally curved in the longitudinal direction which can be set up with ease, speed, and positive accuracy and to which corrections may be easily applied, as, for example, displacing the tooth contact more towards the heel or the toe of the tooth.

In achieving these objectives, there is provided in accordance with this invention a composite cutter block, one member of which carries the blades for cutting the concave tooth flanks while the other member carries the blades for cutting the convex flanks. The two sets of blades enmesh with each other as in a comb, and the axes of rotation of the two halves of the cutter block are offset relatively to each other.

For the cutting operation, considered at the pitch plane, it is convenient to arrange for the two axes of rotation of the halves of the cutter block to lie on a line parallel to a perpendicular erected at mid-face on the longitudinals of the teeth to be cut. In addition it is advisable that the circular paths described by the tips of the cutter blades should coincide on the pitch plane at mid-face on the longitudinal of the tooth to be cut.

However, when certain types of correction are involved it is not absolutely essential to maintain the above optimum position with strict accuracy, although it is also important as a starting point on which to base corrections. In any case, the simplicity of the rules demonstrates the ease with which the principles of the new system can be applied.

The two parts of the cutter block are carried on a common mounting with provision for radial adjustment on a faceplate performing the generating motion, the arrangement being such that it is possible to set the axis of one-half of the cutter block at the correct distance from the center of the faceplate, while the mounting common to both halves pivots about this axis in such a manner that the axis of the other half of the cutter block can be positioned on the parallel to which reference was previously made.

The features of this invention which are believed to be novel are set forth with particularity in the appended claims. The invention itself, however, together with further objects and advantages thereof, may best be understood by reference to the following description taken in connection with the accompanying drawings in which:

Fig. 3 is a side elevation of Fig. 2;

Fig. 4 is a plan view of Fig. 2;

Fig. 5 is a modified form of cutter block in accordance with this invention;

Figure 1:
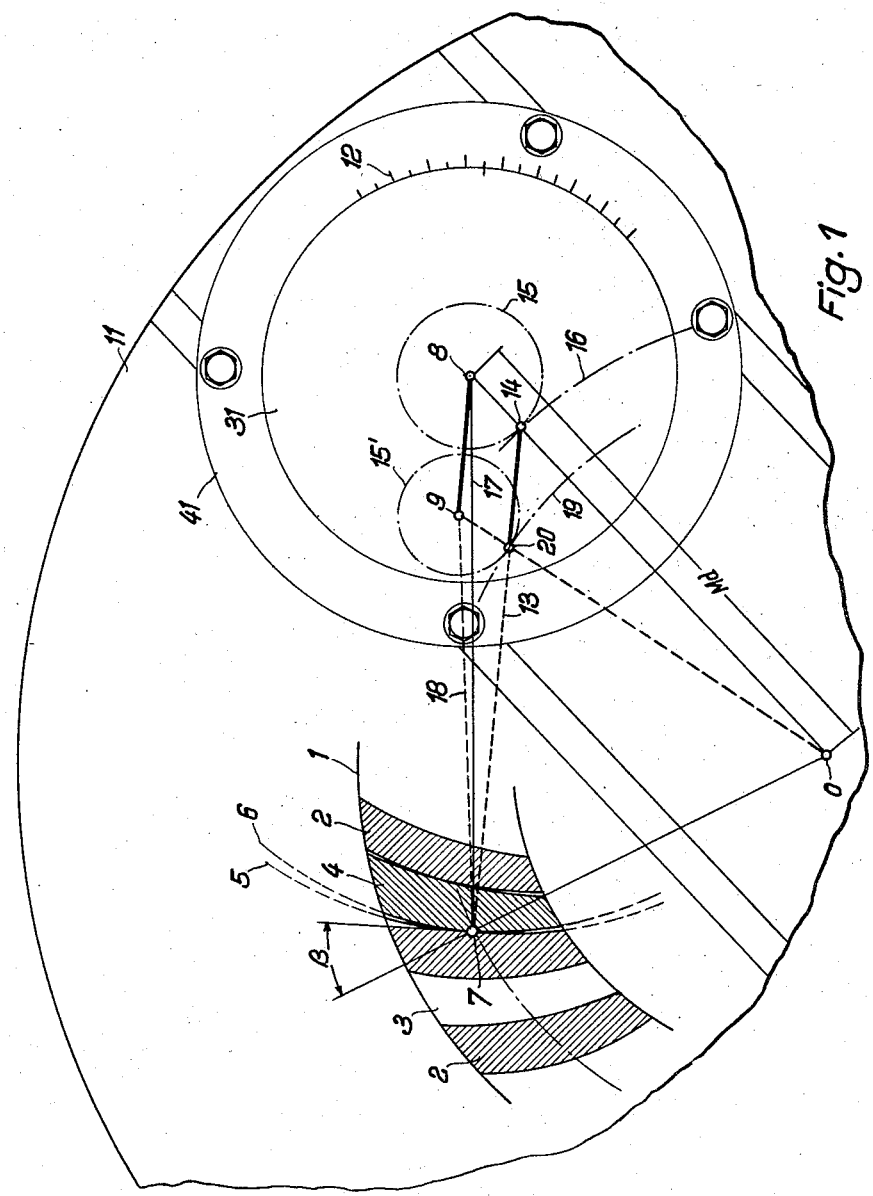
Fig. 1 is a schematic diagram illustrating the new process.

The events which are fundamental to an understanding of the new process take place on the pitch plane of the generating crown wheel formed theoretically by the paths of the cutter points. On referring to Fig. 1 it will be seen that 1 is a section of the pitch plane of a crown wheel with teeth 2 and spaces 3, representing the teeth and spaces of the gear to be cut. A single tooth of the mating gear is shown at 4, this tooth being in engagement with one of the spaces 3. From this engagement it is clear that the degree of curvature on the concave flanks, with their tooth longitudinals 5, is less than that on the convex flanks with their tooth longitudinals 6. The same difference in curvature is exhibited by the concave and convex flanks of all teeth 2 and 4. This difference is obtained by locating the cutter blades for the concave flanks at a greater distance from their axis of rotation than the blades for cutting the convex flanks. In Fig. 1 the cutting edges 7 of the blades of both systems are assumed to be coincident at the point 7. In actual fact the cutting action is such that a blade producing concave flanks alternates with a blade producing convex flanks. However, the coincidence assumed here makes for a readier understanding of the principle.

A two-part cutter block is used. The axis of rotation of the part carrying the blades for cutting the concave flanks 5 is shown at 8, while that for the convex flanks is shown at 9. From a study of Fig. 1 it is clear that the two axes are not coincident but are offset one from the other. This displacement has been deliberately exaggerated in the drawing in order to bring out the effect more clearly. The constructional features of a cutter block of this type will be discussed later. For the purpose of explaining the mode of operation it is only necessary to add that both halves of the cutter block, having points 8 and 9 as their axes, are carried on a common mounting 31. The latter has provision for radial adjustment on faceplate 11, which performs the generating motion, and for clamping in position when one of the axes of rotation (8) has been set at the prescribed distance M$d$ from the center 0 of the faceplate. In addition, cutter block mounting 31 is designed to pivot about the axis 8. Its radial setting about this axis is indicated by scale 12. The mounting 31 is swiveled around until the line joining points 8 and 9 is parallel with the straight line 13 which has its origin in point 7 and is drawn perpendicular to the tooth longitudinals 5 and 6. If the distance M$d$ has been correctly set, the straight line 13 will pass through the point of contact 14 between the small circle 15 and the circle 16 on which the former rolls in conformity with the familiar rules of cycloid generation. The sum of the radii of circles 15 and 16 gives the center distance M$d$. In size they bear the same relationship to each other as the number of starts in the cutter head bears to the number of teeth in the crown wheel. Therefore, the radii themselves can be found accurately by graphical means or by calculation, for which purpose familiarity with the geometry of the cycloid is assumed. The radius of the circular blade path about axis 8 is indicated by the line 17. On a circle with this radius are located, at the pitch plane, all the cutter points (point 7) which produce the concave flanks 5. The cutter points producing the convex flanks, also identified by point 7 in the diagram, rotate with a radius 18 about axis 9. In addition, the center distance 9–0 is fixed by the earlier operation of making line 8—9 parallel to line 13. In this example the number of cutters is the same for both halves of the cutter block, and therefore both halves revolve at the same speed. From this it follows that the dimension 9–0 is made up of the radii of the circles 15' and 19 in the same proportions as the dimension M$d$. At the same time it is apparent that the point 20 at which these two circles contact each other is also located on line 13 along with point 14. This proves that the concave (5) and convex (6) longitudinals in the diagram touch each other at point 7; this is so because the normals drawn to both flanks coincide with line 13. Expressed in other words, this means that at point 7 the concave and convex longitudinals have the same spiral angle $\beta$. Practical operating conditions will often call for some degree of departure from true parallelism between line 8—9 and line 13 in order to apply certain corrections. However, even in such cases the setting procedure described above—and derived from simple rules—is a reliable starting point no matter whether the necessary corrections are determined separately for each individual case or are taken from correction tables.

Figure 2:
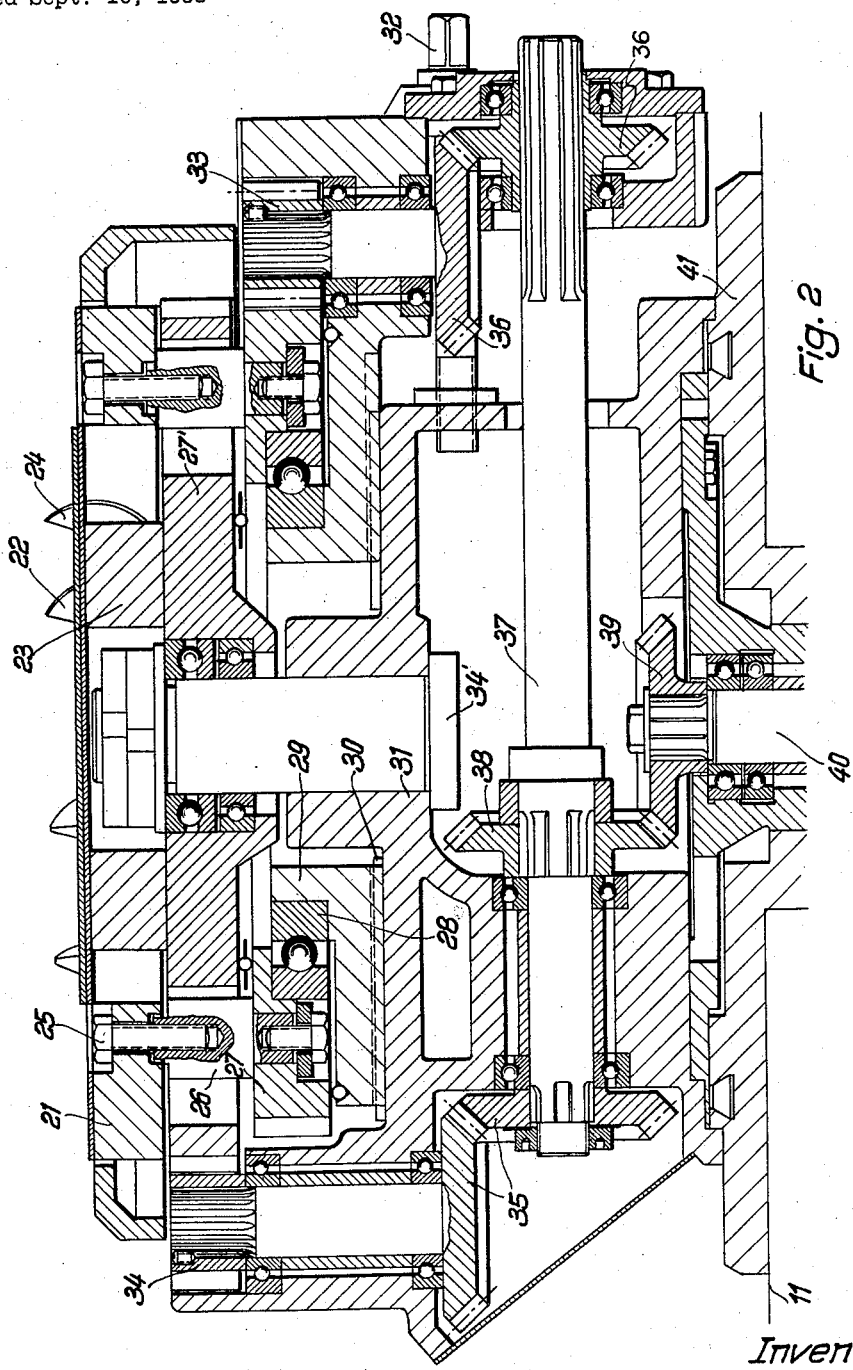
Fig. 2 is a sectional view showing a composite cutter block with its mounting in accordance with this invention.

Referring now to Figs. 2–4, the cutter block and its mounting comprise an annular holder 21 (seee Fig. 4) carrying blades 22 for cutting the concave flanks, and an inner member 23 equipped with blades 24 for the convex flanks. The axes of rotation of the annular holder 21 and the inner member 23 are not coincident, but are offset one from the other in the same way as axes 8 and 9 in Fig. 1. The annular holder 21 rotates about the axis 8, while the inner member 23 rotates about the axis 9. Considered as lying in the common pitch plane, the tips of blades 24, which produce the convex flanks, are disposed on a circle with radius 18, while the tips of blades 22, which produce the concave flanks, lie on a circle with radius 17. For these radii, too, the same reference numbers are used as in the case of Fig. 1 in order to emphasize the connection between the geometrical laws and the actual design of the cutter block.

The circles described by radii 17 and 18 contact each other in point 7; cf. Fig. 1 again. Annulus 21 with its blades is associated with one-half of the cutter block, while inner member 23 belongs to the other half. Both halves have four blades and therefore run at the same speed.

As will best be seen in Fig. 2, annulus 21 is detachably mounted, by means of screws 25 and studs 26, on a gear ring 27 which runs on an anti-friction bearing 28 carried on slide 29. Slide 29 is arranged to move along a guideway 30 provided in baseplate 31. The adjusting screw 32 enables the slide, with driving pinion 33 for gear ring 27 and with the associated pair of bevels 36, to be shifted lengthwise so that varying degrees of separation can be set between axis 8, which is common to gear ring 27 and to annulus 21, and axis 9 of the duplicate gear ring 27' to which the inner member 23 is connected. This inner member is carried on an arbor 34' which in turn is fixed to the baseplate 31. The last-mentioned gear ring 27' is driven by pinion 34 which receives its drive from a pair of bevels 35. The two sets of bevels 35 and 36 have a common intermediate shaft 37 driven by bevels 38 and 39. Drive to the whole assembly is by shaft 40. The latter is mounted co-axially with arbor 34' with the object of allowing baseplate 31 to pivot about this arbor so that the line connecting axes of rotation 8 and 9 can be made parallel with line 13 (Fig. 1).

Baseplate 31 is supported by a backplate 41 and is so arranged that it can swivel about shaft 40. The backplate also incorporates bearings for shaft 40. A scale 12 (Fig. 1) enables the desired amount of swivel to be set.

Backplate 41 is attached to faceplate 11, and as mentioned earlier, can be shifted radially over the latter towards the center of the faceplate to permit the setting of the distance M$d$ (refer also to Fig. 1).

Fig. 5 shows a further practical example of a cutter block together with its mounting and driving gear. In this model the degree of eccentricity between axes 8 and 9 (refer also to Fig. 1) is not adjustable. Each half of the cutter block is equipped with two blades, as shown in the schematic plan view of Fig. 6. Blades 43 in the outer annulus 42 cut the concave flanks, while blades 45, mounted in the inner member 44, cut the convex flanks.

Annulus 42 is interchangeably mounted on gear 46; inner member 44 is attached to drive shaft 48. Fixed to drive shaft 48 is a gear ring 49 having the same number of teeth as gear 46. Drive shaft 48 is carried in bearings in baseplate 50; gear 46, on the other hand, is mounted on anti-friction bearings 52 fitted on the periphery of hub 51 which is machined eccentrically in relation to drive shaft 48. This eccentricity corresponds to the separation between the axes 8 and 9 in Fig. 1.

The two gears 46 and 49 are connected together by shaft 53 which carries the coupling gears 54. The actual location of this transmission is apparent from the schematic diagram of Fig. 6. In Fig. 5 it is shown—for ease of understanding—in the same plane as the section illustrated.

The base is pivotally mounted on a backplate 55 and, when swiveled to the desired position, can be clamped to the plate by means of screw 56. Plate 55 is arranged to pivot about spindle 57 in faceplate 11. The drive to the cutter block is via spindle 57 and a pair of gears 58.

Figure 7:
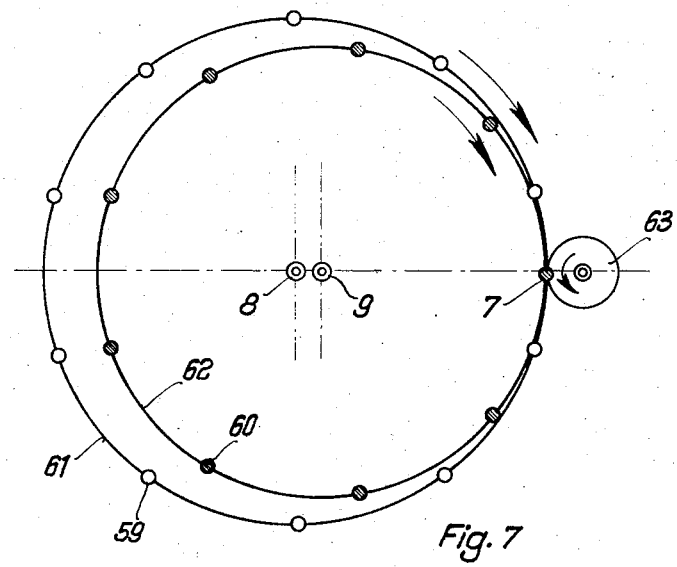
Fig. 7 is a modified version of the functional diagram given in Fig. 6.
Figure 6:
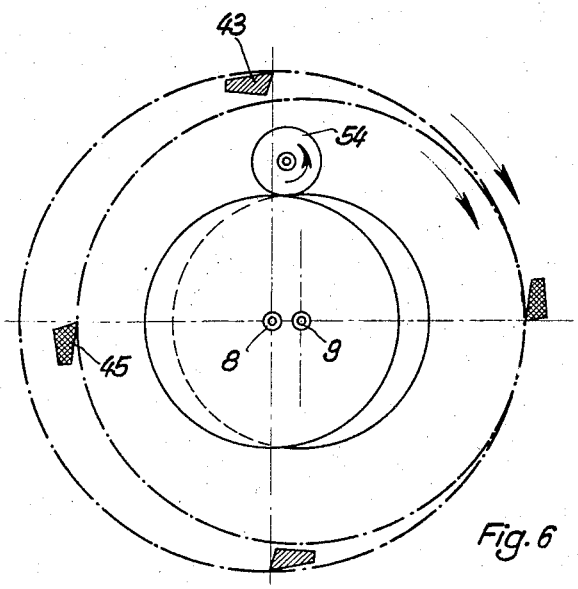
Fig. 6 is a functional diagram for Fig. 5.

In the examples discussed so far, the number of blades for cutting the concave flanks is the same as the number for cutting the convex flanks, for example two each in the case of Fig. 6. In Fig. 7, however, ten blades are provided for cutting the concave flanks, and nine blades for cutting the convex flanks (59 and 60). For the sake of simplicity the cutting edges of the blades are represented by small circles. The two blade systems are disposed on the circles 61 and 62 which can be regarded as the pitch circles of the respective driving gears. The driving pinion common to both gears is indicated at 63. The speeds of the two rotating members are inversely proportional to the number of starts. This type of design offers distinct advantages when the gears being cut exhibit a considerable difference in curvature as between the longitudinal contours of their concave and convex flanks, or when the machine is required to cut large bevel gears. Although the drawings show the cutter blocks fitted with circular cutters of the chaser type, the method of attachment and the design of the cutters has not been described here because such details are common knowledge. Furthermore there is not the least difficulty in applying the principle of this invention to cutter blocks designed to take other types of cutter or blade—for example, bar-shaped cutters.

In both the embodiment of the invention shown in Figs. 2–4 and the embodiment shown in Fig. 5, a single cutter block and the same blade equipment allow a number of modules to be cut. In using the embodiment of Figs. 2–4 to cut a given module, the distance between axes 8 and 9 is adjusted so that the two circles, which connect the cutter points with the pitch plane, contact each other midway along the longitudinal contour of the tooth; e.g., point 7 in Fig. 1. If it is required to change the cutter block from one module to another, it is only necessary to alter the distance between axes 8 and 9 via adjusting screw 32 (Figs. 2–4) until the circles again contact each other in the new pitch plane.

In the cutter block illustrated in Fig. 5 there are no facilities for adjusting the eccentricity of the axes 8 and 9. In spite of this, the cutter block of Fig. 5 can be used with the same blade equipment to cut a number of different modules in the same way as the cutter block of Figs. 2–4 previously described. This is achieved by making the outer annulus 42 with its blades 43 independently rotatable relative to the inner member 44 with its blades 45. The adjustment is made with the aid of the clamping bolts 64 which are arranged to move in an annular slot in gear 46.

If the outer annulus 42 is moved around, the outer blades will cease to lie mid-way between the inner blades, which is the position in which they are shown in Fig. 6. The effect of this on the cutting operation depends on the direction in which annulus 42 has been adjusted, but the result is that the cutter blades enter the gear blank at either an earlier or a later instant than they would have done had they remained located in their central position. The width of the spaces on the pitch plane therefore becomes larger or smaller than the thickness of a tooth. This adjustment is accordingly a convenient method of setting the required amount of backlash. Alteration of the depth of the spaces in such a manner that, after adjustment of annulus 42, the desired relation between space width and tooth thickness is obtained is a method which enables a different module to be cut. And so it is apparent that adjustment of annulus 42 is a practical means of setting a desired module.

The new process is very easy to apply in practice. When working out the details of the cutting operation there is no need to take into account the composite nature of the cutter block. The gear calculations are made in the usual way just as if the cutter block had a single axis of rotation at 8 in Fig. 1. This axis is set at the calculated distance Md. Any correction decided upon on the basis of calculation or experience is then set in on scale 12 by swiveling the cutter block about axis 8.

The invention is by no means restricted to the examples given; for example, the gears driving the two halves of the cutter block could be replaced by suitable drivers. It would also be possible to use worm gearing.

It can be seen from the foregoing that there is provided in accordance with this invention a method and apparatus for the production of teeth cycloidally curved in the longitudinal direction which simplifies the design of bevel gears. Furthermore, the apparatus can be set up with ease, speed and positive accuracy.

While there have been shown and described particular embodiments of the invention, it will be obvious to those skilled in the art that various changes and modifications can be made therein without departing from the invention and, therefore, it is aimed in the appended claims to cover all such changes and modifications as fall within the true spirit and scope of the invention.

What I claim as my invention is:

1. A machine for cutting bevel gears with teeth cycloidally curved in the longitudinal direction comprising a cutter block comprising a first blade holder including cutting blades for cutting the convex tooth flangs, a second blade holder including cutting blades for cutting the concave tooth flanks, said second blade holder being substantially annular in shape and surrounding said first blade holder in the same plane as said first blade holder, each of said blade holders being rotatable about a separate axis of rotation, the respective axes of rotation of said first and second blade holders being offset from each other, the respective cutting blades of said first and second blade holders moving in circular paths about their respective axes, said circular paths contacting each other in a common point, the blades on each blade holder being spaced apart sufficiently on their respective holder to permit interlocking of the blades of each holder with the blades of the other holder in the region of said common point, a common mounting for said blade holders, said common mounting being pivotally movable about an axis coincident with the axis of rotation of said first blade holder, a faceplate performing a gear generating motion, and means for securing said common mounting upon said faceplate.

2. A machine as defined in claim 1, in which the displacement between the axes of rotation of said first and second blade holders is adjustable.

3. A machine as defined in claim 1, in which one of said blade holders is rotatably adjustable with respect to said common mounting to permit adjustment of the relative angular positions of the blades of one of said holders with respect to the blades of the other of said holders.

4. A cutter block for cutting bevel gears with teeth cycloidally curved in the longitudinal direction comprising a first blade holder including cutting blade for cutting the convex tooth flanks, a second blade holder including cutting blades for cutting the concave tooth flanks, each of said blade holders being rotatable about a separate axis of rotation, the respective axes of rotation of said first and second balde holders being offset from each other, the blades of each of said blade holders moving in circular paths about their respective axes, said circular paths contacting each other in a common point, the blades on each balde holder being spaced apart sufficiently on their respective holder to permit interlocking of the blades of each holder with the blades of the other blade holder in the region of said common point.

5. A cutter block for cutting bevel gears with teeth cycloidally curved in the longitudinal direction comprising a first blade holder for cutting the convex tooth flanks, a second blade holder for cutting the concave tooth flanks, each of said blade holders being rotatable about a seprate axis of rotation, the respective axes of rotation of said first and second blade holders being offset from each other, the blades of each of said holders moving in circular paths about their respective axes, the circular path of said second blade holder being displaced further from its axis of rotation than the displacement of the circular path of the blades of said first blade holder from its axis, the respective circular paths of said blades of said first and second holders contacting each other in a common point, the blades of each of said respective holders being spaced apart sufficiently on their respective holder to permit interlocking with the blades of the other holder in the region of said common point.

6. A process for the production of bevel gears with teeth cycloidally curved in the longitudinal direction by means of a cutter block rotating about its own axis and simultaneously performing a planetary movement about the axis of the imaginary crown wheel represented by the paths of the cutter blades in which the stock at the tooth being cut is alternately removed at the concave and convex flanks of the tooth by interlocking cutter blades for the concave and the convex flanks respectively, the respective cutting blades for the convex flanks and for the concave flanks rotating in circular paths about axes which are displaced from each other, said circular paths contacting in the region of the tooth being cut.

7. A machine for cutting bevel gears with teeth cycloidally curved in the longitudinal direction comprising a cutter block, a first cutter blade holder mounted upon said block for rotation about a first axis fixedly located with respect to said block, a second cutter blade holder mounted upon said block for rotation about a second axis parallel to said first axis, means mounting said block upon a face plate which performs a gear generating motion, said mounting means including means supporting said block for pivotal movement upon said face plate about said first axis, means for securing said block to said face plate, means for adjustably locating said second cutter blade holder upon said block with said second axis in selected spaced relationship to said first axis, and means for driving both of said cutter blade holders in rotation about their respective axes.

8. A machine as defined in claim 7 including means for locating said cutter block at selected distances from the center of said face plate to thereby adjust the distance of said first axis from the center of said face plate.

9. A machine for cutting bevel gears with teeth cycloidally curved in the longitudinal direction comprising a cutter block, a first cutter blade holder mounted upon said block for rotation about a first axis, a second cutter blade holder mounted upon said block for rotation about a second axis parallel to said first axis, a face plate, means mounting said cutter block for pivotal movement upon said face plate about an axis coincident with said first axis, means for locking said block to said face plate, a plurality of cutting blades carried by each of said blade holders, said first blade holder carrying a different number of blades than said second blade holder, said first and said second axes being located relative to each other so that the circular paths traversed by the blades upon rotation of the respective blade holders coincide at a common point, and means for rotating said blade holders at speeds inversely proportional to the number of blades mounted on the respective holders.

10. The process for the production of bevel gears having teeth cycloidally curved in the longitudinal direction comprising the steps of employing two sets of cutter blades to engage a gear blank, rotating the first of said sets of blades about a first axis, rotating the second of said sets of blades about a second axis parallel to said second axis, and located with respect to said first axis to establish a single point of coincidence between the respective circular paths of said sets of cutter blades, and continuously rotating said first and said second axes about a third axis while maintaining said point of coincidence at a selected radial distance from said third axis.

11. The process set forth in claim 10 wherein said first and second axes of rotation of said cutter blades are so located with respect to each other and said third axis that a straight line intersecting said first and second axes is disposed in parallel relationship to a line perpendicular to the flank of a tooth formed on a gear blank at the point of coincidence of said respective circular paths of said cutter blades.

References Cited in the file of this patent

UNITED STATES PATENTS

| | | |
|---|---|---|
| 1,370,573 | Wingqvist | Mar. 8, 1921 |
| 2,260,605 | Carlsen | Oct. 28, 1941 |
| 2,300,340 | Carlsen | Oct. 27, 1942 |